L. G. RILEY.
SYSTEM AND METHOD OF CONTROL FOR ELECTRIC MOTORS.
APPLICATION FILED OCT. 3, 1913.
1,155,164.
Patented Sept. 28, 1915.
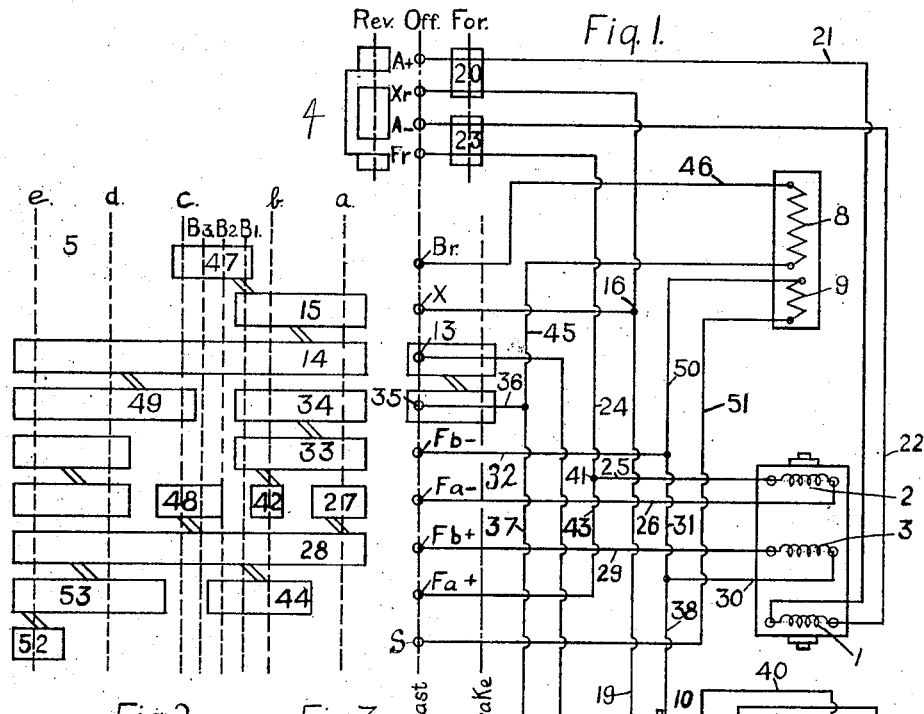
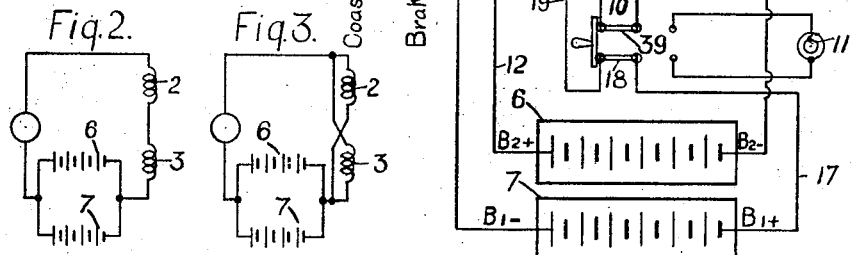
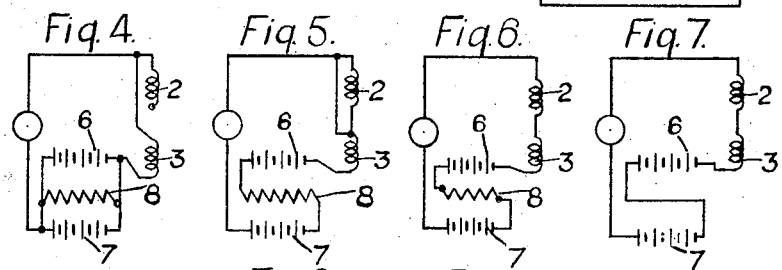
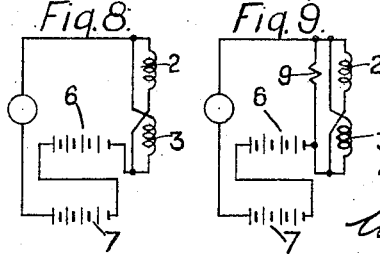
WITNESSES:
INVENTOR
Lynn G. Riley
BY
Wesley G. Carr
ATTORNEY

UNITED STATES PATENT OFFICE.

LYNN G. RILEY, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM AND METHOD OF CONTROL FOR ELECTRIC MOTORS.

1,155,164. Specification of Letters Patent. Patented Sept. 28, 1915.

Application filed October 3, 1913. Serial No. 793,097.

*To all whom it may concern:*

Be it known that I, LYNN G. RILEY, a citizen of the United States, and a resident of Wilkinsburg, in the county of Allegheny and State of Pennsylvania, have invented a new and useful Improvement in Systems and Methods of Control for Electric Motors, of which the following is a specification.

My invention relates to systems and methods of control for electric motors, and it has special reference to the control of electric vehicle motors which are operated by energy from storage batteries.

The object of my invention is to provide a system and method of control for electric motors, of the class above indicated, whereby a plurality of motor-operating speeds may be secured, the arrangement being such that all sections of the supply batteries are continuously and uniformly discharged during operation.

In the prior art, a transition of the sections of supply batteries from a parallel to a series relation has usually involved an open-circuiting of all or of a portion of the sections. The first method results in an undesirable surging in the line when the battery circuit is again closed and the second method imposes an overload on a portion of the battery, thereby causing an excessive burning of contact members and an unequal amount of discharge of the several sections, with the consequent unbalancing of capacity and voltage.

According to my present invention, I provide a method and means whereby the foregoing disadvantageous features are obviated since, during the above-mentioned transition from parallel to series relation, continuous and evenly-balanced currents are maintained through the sections of batteries. Another advantage is the permissible elimination of magnetic blowout devices by reason of the relatively small current carried by any one battery section.

Variations in the field winding connections are effected in conjunction with the changes in battery connections to produce satisfactory and efficient operation.

In the accompanying drawing, Figure 1 is a diagrammatic view of a system of control embodying my invention, a controller of the drum type being shown developed into a single plane, in a well known manner; Figs. 2 to 9, inc., are diagrams respectively illustrating the circuit connections for the five accelerating or motor-operating positions of the controller and for the three main positions occupied during transition of the sections of batteries from parallel to series.

Referring to the drawing, the control system here shown comprises an electric motor having an armature 1 and field magnet windings 2 and 3, a reversing switch 4, a controller 5 that is adapted to occupy a plurality of motor-operating positions $a$ to $e$, inclusive; storage battery sections 6 and 7, a "bridging" resistance 8, a "shunting" resistance 9, a battery-charging switch 10 and a charging plug 11.

The battery-charging switch 10 is a double pole, double-throw switch and, when thrown to the right, as shown on the drawing, connects the storage battery sections 6 and 7 in series relation between the terminals of the charging plug 11. When thrown to the opposite position, the connections of the storage batteries are dependent upon the positions of the controller 5, as hereinafter pointed out.

Assuming that the reversing switch 4 is moved into the position marked "Forward" and that the controller is moved into its position $a$, a connection is established from one terminal $B_2+$ of the battery section 6 through a conductor 12, a control finger 13, contact members 14 and 15 and a control finger X, to a junction point 16. A connection is also established from a terminal $B_1+$ of the battery section 7 through a conductor 17, a switch-blade 18 and a conductor 19 to the junction point 16, circuit being continued from this point through control fingers $X_R$ and $A+$ on the reversing switch 4 which fingers are bridged by a contact member 20, a conductor 21, the motor armature 1, a conductor 22, control fingers $A-$ and $F_R$ on the reversing switch 4, which fingers are bridged by a contact member 23, conductors 24 and 25, the field magnet winding 2, a conductor 26, a control finger $F_a-$, contact members 27 and 28, a control finger $F_b+$, a conductor 29, the field magnet winding 3, conductors 30, 31 and 32, a control finger $F_b-$, contact members 33 and 34, a control finger 35, and conductors 36 and 37 to a terminal $B_1-$ of the battery 7. A connection is also established from the conductor 30 through a conductor 38, a switch blade 39 and a conductor 40 to a terminal $B_2-$ of the battery 6. Circuit connections are thus established as shown in Fig. 2 of the drawing. If the controller is now moved to position $b$, the terminals $B_2+$ and $B_1+$ of the battery sections are still connected to the junction point 16, circuit being continued from this point, as in position $a$, through the armature 1, the reversing-switch 4 and the conductor 24 to a junction-point 41, one circuit being continued from here through the conductor 25, the field magnet winding 2, the conductor 26, the control finger $F_a-$ and a contact member 42 to the contact member 33. A second circuit is established from the junction point 41 through a conductor 43, a control finger $F_a+$, a contact member 44, the contact member 28, the control finger $F_b+$, the conductor 29, the field magnet winding 3, conductors 30, 31 and 32 and the control finger $F_b-$ to the contact member 33. Consequently, the field magnet windings 2 and 3 are connected in parallel relation from the junction-point 41 to the contact-member 33. The circuit connections are otherwise the same as before, and, as a result, the arrangement of Fig. 3 is obtained.

In position $B_1$ of the controller, the field magnet winding 2 is open-circuited by reason of the disengagement of the contact member 42 from the control finger $F_a-$. A new circuit is established from the conductor 36, which is connected to the terminals $B_1-$ and $B_2-$ of the battery sections, through a conductor 45, the bridging resistance 8, a conductor 46, a control finger $B_r$ and a contact member 47 to the contact member 15, which is connected to the terminals $B_1+$ and $B_2+$ of the battery sections. The bridging resistance 8 is thereby connected in parallel relation with the battery sections, and the arrangement of Fig. 4 is provided.

In position $B_2$, the previously disconnected field magnet winding 2 is connected to the opposite end of the field magnet winding 3 from that shown in Fig. 3, a circuit being established from the junction-point 41, through the conductor 25, the field winding 2, the conductor 26, the control finger $F_a-$, a contact member 48, the contact member 28, the finger $F_b+$ and the conductor 29 to the field magnet winding 3. The field magnet winding 2 is thus short-circuited by a connection from the junction-point 41, through the conductor 43, the control finger $F_a+$ and the contact member 44 to the contact member 28. Also the contact members 15, 34 and 33 are disengaged from their respective control fingers, thereby disconnecting the terminals $B_1+$ and $B_2-$ of the battery sections 7 and 6, respectively, from the bridging resistance 8. A series relation of the battery sections and the resistance is thus obtained and the connections of Fig. 5 are established.

In position $B_3$, the contact member 44 is disengaged from the control finger $F_a+$, thereby removing the above-mentioned short-circuiting connection around the field magnet winding 2. (See Fig. 6.)

In position $c$, a contact member 49, which is connected to the contact member 47, engages the control finger 35. The bridging resistance 8 is thus short-circuited, the connections being as shown in Fig. 7.

It will be understood that, throughout the battery transition, as effected by the connections of positions $B_1$, $B_2$, $B_3$ and $c$, continuous and evenly-balanced currents are maintained in the several battery sections.

In position $d$, the field magnet windings are again connected in parallel relation, as in Fig. 2, other connections remaining the same. (See Fig. 8.)

In position $e$, a connection is established from the conductor 31, through a conductor 50, the shunting resistance 9, a conductor 51, a control finger S and contact members 52 and 53 to the contact member 28. By this means, the shunting resistance 9 and the field windings are all connected in parallel relation, as shown in Fig. 9.

It thus appears that a plurality of gradually-increasing motor speeds are provided by first establishing a low-voltage connection between the battery sections, and a strong field. The field is then weakened by connecting the parts of the field magnet windings in parallel relation. The field windings are next changed over to series relation, as at first, and, meanwhile, the transition of the battery sections from parallel to series or high-voltage connection is accomplished without open-circuiting or unequally loading any section. The field magnet windings are again connected in parallel relation and, for the final speed, the field is weakened by shunting a resistance across the parallel windings.

Variations in the circuit connections and the arrangements of the control positions may be effected within the spirit and scope of my invention, and I desire that only such limitations shall be imposed as are indicated in the appended claims.

I claim as my invention:

1. The method of transition from a series-parallel relation of a plurality of energy sources and a plurality of dynamo-electric machine windings to a series relation thereof that consists in disconnecting one of said windings, inserting a translating device across said sources of energy, connecting one winding across a portion of the line, opening certain connections of said sources to dispose them in series with said translating device, opening the portion of the line that short-circuits one of said windings and excluding said device.

2. The method of transition from a series-parallel relation of a plurality of energy sources and a plurality of field magnet windings to a series relation thereof that consists in disconnecting one of said windings, inserting a translating device across the common terminals of said sources, connecting said previously disconnected winding across a relatively short portion of the line, opening connections with said device at opposite ends of the respective sources, opening the portion of the line that short-circuits said previously disconnected winding and excluding said device.

3. The method of controlling an electric motor which is supplied with energy from a plurality of sources initially in parallel and a plurality of the field magnet windings of which are connected in parallel that consists in disconnecting one of said windings, inserting a translating device across the common terminals of said sources, connecting one of said windings in parallel with a portion of the line intermediate another of said windings and the armature winding, opening certain connections of said sources to dispose them in series with said device, opening the portion of the line that short-circuits one of said field magnet windings and excluding said device.

4. The method of controlling an electric motor which is supplied with energy from a plurality of sources initially in parallel and a plurality of the field windings of which are connected in parallel that consists in disconnecting one of said windings, inserting a translating device across the common terminals of said sources, connecting said previously disconnected winding in parallel with a relatively short portion of the line intermediate another of said windings and the armature winding, opening connections with said translating device at opposite ends of the respective sources, opening the portion of the line that short-circuits said previously disconnected winding and excluding said device.

5. The method of controlling an electric motor which is supplied with energy from a plurality of sources that consists in the following steps: first, connecting said sources in parallel sections and the field magnet windings and the armature in series therewith; second, connecting the field magnet windings in parallel sections; third, disconnecting one of said windings and inserting a translating device across the common terminals of said sources; fourth, connecting one of said windings in parallel with a portion of the line intermediate another of said windings and the armature winding and opening certain connections of said sources to dispose them in series with said device; fifth, opening the portion of the line that short-circuits one of said field magnet windings; sixth, excluding said translating device; and seventh, connecting the field magnet windings in parallel sections.

6. The method of controlling an electric motor which is supplied with energy from a plurality of batteries that consists in the following steps: first, connecting said batteries in parallel sections and the field magnet windings and the armature in series therewith; second, connecting the field magnet windings in parallel sections; third, disconnecting one of said windings and inserting a resistance across the common terminals of said batteries; fourth, connecting said previously disconnected winding in parallel with a relatively short portion of the line intermediate another of said windings and the armature winding and opening connections with said resistance at opposite ends of the respective batteries; fifth, opening the portion of the line that short-circuits said previously disconnected winding; sixth, excluding said resistance; seventh, connecting the field magnet winding in parallel sections; and eighth, connecting a resistance across said field magnet windings.

7. The combination with a supply circuit, a translating device, and a plurality of sources of energy and a plurality of dynamo-electric machine windings connected in series-parallel relation, of circuit connections for successively disconnecting one of said windings, inserting said device across said sources of energy, connecting one winding across a portion of the supply circuit, opening certain connections of said sources to dispose them in series with said device, opening the portion of the supply circuit that short-circuits one of said windings, and excluding said device.

8. The combination with a supply-circuit, a resistor, and a plurality of batteries and a plurality of motor field windings initially connected in series-parallel relation, of circuit connections for successively disconnecting one of said windings, inserting said resistor across the common terminals of said batteries, connecting said previously disconnected winding in parallel with a relatively short portion of the supply circuit, opening connections with said resistor at opposite ends of the respective batteries, opening the portion of the supply circuit that short-circuits said previously disconnected winding, and excluding said resistor.

In testimony whereof, I have hereunto subscribed my name this 29th day of Sept., 1913.

LYNN G. RILEY.

Witnesses:
G. R. IRWIN,
B. B. HINES.